US012784390B2

(12) United States Patent
Russo et al.

(10) Patent No.: US 12,784,390 B2
(45) Date of Patent: Nov. 3, 2026

(54) COMPUTER-IMPLEMENTED METHOD FOR RECOMMENDING CHANGES WITHIN A SECURITY SYSTEM

(71) Applicant: MOTOROLA SOLUTIONS, INC., Chicago, IL (US)

(72) Inventors: Pietro Russo, Melrose, MA (US); Pawel Jurzak, Cracow (PL); Raguraman Kumaresan, Naperville, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 578 days.

(21) Appl. No.: 18/000,428

(22) PCT Filed: Sep. 4, 2020

(86) PCT No.: PCT/PL2020/050061

§ 371 (c)(1),
(2) Date: Dec. 1, 2022

(87) PCT Pub. No.: WO2022/050855

PCT Pub. Date: Mar. 10, 2022

(65) Prior Publication Data

US 2023/0291870 A1 Sep. 14, 2023

(51) Int. Cl.
*G06V 10/25* (2022.01)
*G06V 20/52* (2022.01)
(Continued)

(52) U.S. Cl.
CPC .............. *G06V 10/25* (2022.01); *G06V 20/52* (2022.01); *H04N 23/69* (2023.01); *H04N 23/695* (2023.01)

(58) Field of Classification Search
CPC ........ G06V 10/25; G06V 20/52; H04N 23/69; H04N 23/695; H04N 7/183; G08B 13/19671; G08B 13/19645; G08B 29/18
See application file for complete search history.

(56) References Cited

U.S. PATENT DOCUMENTS 8,533,144 B1 9/2013 Reeser et al.
9,626,849 B2 4/2017 Dixon et al.
(Continued)

FOREIGN PATENT DOCUMENTS

EP 3343443 A1 7/2018
EP 3343443 B1 * 12/2022 ......... G06K 7/10811

OTHER PUBLICATIONS

The International Search Report and the Written Opinion corresponding patent application No. PCT/PL2020/050061 filed: Sep. 4, 2020, all pages.

*Primary Examiner* — James J Yang

(57) ABSTRACT

A computer-implemented method for recommending changes in relation to video security camera deployment within a security system is disclosed. The computer-implemented method includes obtaining, at an at least one electronic computing device, video analytics data in respect of a plurality of video frames captured by an at least one video security camera operating under a plurality of operational parameters. When processing of the video analytics data indicates at least one issue in relation to performance of the video security camera, a visual message or an audio message is delivered by a screen or a speaker respectively. The visual or audio message indicates a recommendation in relation to some change, replacement or upgrading of the video security camera.

19 Claims, 4 Drawing Sheets

(51) Int. Cl.
*H04N 23/69* (2023.01)
*H04N 23/695* (2023.01)

(56) References Cited

U.S. PATENT DOCUMENTS

| | | | | |
|---|---|---|---|---|
| 10,636,173 | B1 * | 4/2020 | Beach | H04N 23/90 |
| 11,354,994 | B1 | 6/2022 | Staudacher et al. | |
| 2005/0046699 | A1 * | 3/2005 | Oya | G08B 13/19669<br>348/E7.086 |
| 2012/0078833 | A1 | 3/2012 | Johnson | |
| 2018/0356809 | A1 | 12/2018 | Trainor et al. | |
| 2019/0288911 | A1 * | 9/2019 | Amini | G06V 20/41 |

* cited by examiner

COMPUTER-IMPLEMENTED METHOD FOR RECOMMENDING CHANGES WITHIN A SECURITY SYSTEM

CROSS-REFERENCE TO RELATED APPLICATIONS

This is the U.S. National Stage of International Application No. PCT/PL20/50061filed Sep. 4, 2020, the entire contents of which are incorporated herein by reference in its entirety.

BACKGROUND

Within the security industry, software exists for helping a user in designing a system of cameras (for example, selecting appropriate cameras, lenses, storages appliances, etc. to be deployed within one or more geographic areas). An example of such software is the Avigilon System Design Tool (SDT)™ produced by Avigilon Corporation. Such software can be a useful step in the process of initial design and installation of a security system; however thereafter the software has served its purpose and it does not assist in automated determination of performance issues discovered post-installation.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
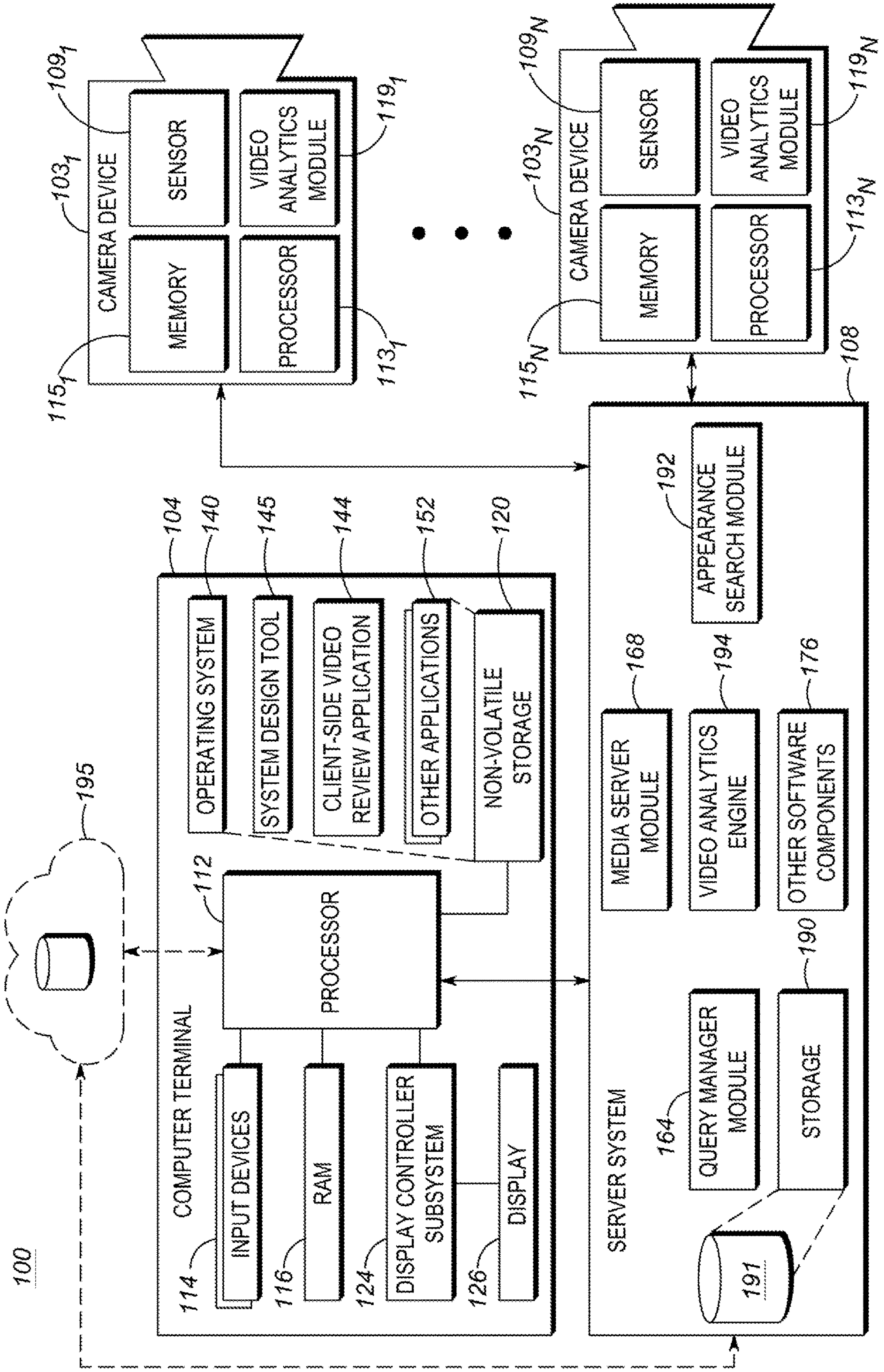
FIG. 1 is a block diagram of a security system in accordance with example embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiments, there is provided a computer-implemented method for recommending changes in relation to video security camera deployment within a security system. The computer-implemented method includes obtaining, at an at least one electronic computing device, a plurality of operational parameters of at least one video security camera that is deployed in a definable geographical area. The computer-implemented method also includes determining, at the at least one electronic computing device, at least one sub-area of interest that is inside the geographical area, to be assessed for video security performance based on a plurality of received object search inputs that correspond to a plurality of video frames captured by the at least one video security camera. The computer-implemented method also includes obtaining, at the at least one electronic computing device, video analytics data associated with the at least one video security camera operating under the operational parameters. The video analytics data identifies at least one confidence level with which a respective at least one object of interest is recognized based on the object search inputs. The computer-implemented method also includes determining, at the at least one electronic computing device, a measure of performance of the at least one video security camera relative to the at least one sub-area of interest as a function of the at least one confidence level. When the measure of performance by the at least one video security camera relative to the at least one sub-area of interest is lower than a performance threshold, a visual message or an audio message is provided. The visual message or the audio message is delivered by a screen or a speaker respectively, indicating at least one of: a recommended change in spatial position of the at least one video security camera; a recommended upgrade in at least one of the operational parameters of the at least one video security camera; and a recommended deployment of at least one new video security camera, with an upgraded operational parameter and which will replace the at least one video security camera.

In accordance with another example embodiment, there is provided a security system that includes at least one video security camera deployable in a definable geographical area. The at least one video security camera includes at least one image sensor configured to capture a plurality of video frames. The security system also includes at least one electronic computing device communicatively coupled to the at least one video security camera. The at least one electronic computing device is configured to obtain a plurality of operational parameters of the at least one video security camera. The at least one electronic computing device is also configured to determine at least one sub-area of interest, inside the geographical area, to be assessed for video security performance based on a plurality of received object search inputs that correspond to the plurality of video frames. The at least one electronic computing device is also configured to obtain video analytics data associated with the at least one video security camera operating under the operational parameters. The video analytics data identifies at least one confidence level with which a respective at least one object of interest is recognized based on the object search inputs. The at least one electronic computing device is also configured to determine a measure of performance of the at least one video security camera relative to the at least one sub-area of interest as a function of the at least one confidence level. A screen or a speaker is communicatively coupled to the at least one electronic computing device. When the measure of performance by the at least one video security camera relative to the at least one sub-area of interest is lower than a performance threshold, the screen or speaker is configured to operate cooperatively with the at least one electronic computing device in providing a visual message or an audio message, respectively, indicating at least one of: a recommended change in spatial position of the at least one video security camera; a recommended upgrade in at least one of the operational parameters of the at least one video security camera; and a recommended deployment of at least one new video security camera, with an upgraded operational parameter and which will replace the at least one video security camera.

In accordance with yet another example embodiment, there is provided a computer-implemented method for recommending changes in relation to video security camera deployment within a security system. The computer-implemented method includes obtaining, at an at least one electronic computing device, a plurality of operational parameters of at least one video security camera that is deployed in a definable geographical area. The computer-implemented method also includes determining, at the at least one electronic computing device, at least one sub-area of interest that is inside the geographical area. The computer-implemented method also includes obtaining, at the at least one electronic computing device, video analytics data in respect of a plurality of video frames captured by the at least one video security camera operating under the operational parameters. The computer-implemented method also includes processing the video analytics data to assess performance of the at least one video security camera relative to the at least one sub-area of interest. When the processing of the video analytics data indicates at least one issue in relation to the performance, a visual message or an audio message is provided. The visual message or the audio message is delivered by a screen or a speaker respectively, indicating at least one of: a recommended change in spatial position of the at least one video security camera in connection with resolving the issue; a recommended replacement of the at least one video security camera with a same-type or different-type sensor device in connection with resolving the issue; and an upgrade in relation to the at least one video security camera in connection with resolving the issue.

Each of the above-mentioned embodiments will be discussed in more detail below, starting with example system and device architectures of the system in which the embodiments may be practiced, followed by an illustration of processing blocks for achieving an improved technical method, device, and system for recommending changes within a security system.

The term "geographic area" as used herein means a three-dimensional coverage area and includes both indoor and outdoor locations, and also includes coverage areas that do not necessarily have fixed boundaries.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1 which is a block diagram of an example security system 100 within which methods in accordance with example embodiments can be carried out. Included within the illustrated security system 100 are one or more computer terminals 104 and a server system 108. In some example embodiments, the computer terminal 104 is a personal computer system; however in other example embodiments the computer terminal 104 is a selected one or more of the following: a handheld device such as, for example, a tablet, a phablet, a smart phone or a personal digital assistant (PDA); a laptop computer; a smart television; and other suitable devices. With respect to the server system 108, this could comprise a single physical machine or multiple physical machines. It will be understood that the server system 108 need not be contained within a single chassis, nor necessarily will there be a single location for the server system 108. As will be appreciated by those skilled in the art, at least some of the functionality of the server system 108 can be implemented within the computer terminal 104 rather than within the server system 108.

The computer terminal 104 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the computer terminal 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 104 and the server system 108 are within the same Local Area Network (LAN).

The computer terminal 104 includes at least one processor 112 that controls the overall operation of the computer terminal. The processor 112 interacts with various subsystems such as, for example, input devices 114 (such as a selected one or more of a keyboard, mouse, touch pad, roller ball and voice control means, for example), random access memory (RAM) 116, non-volatile storage 120, display controller subsystem 124 and other subsystems. The display controller subsystem 124 interacts with display screen 126 and it renders graphics and/or text upon the display screen 126.

Still with reference to the computer terminal 104 of the security system 100, operating system 140 and various software applications used by the processor 112 are stored in the non-volatile storage 120. The non-volatile storage 120 is, for example, one or more hard disks, solid state drives, or some other suitable form of computer readable medium that retains recorded information after the computer terminal 104 is turned off. Regarding the operating system 140, this includes software that manages computer hardware and software resources of the computer terminal 104 and provides common services for computer programs. Also, those skilled in the art will appreciate that the operating system 140, client-side video review application 144, system design tool module 145, and other applications 152, or parts thereof, may be temporarily loaded into a volatile store such as the RAM 116. The processor 112, in addition to its operating system functions, can enable execution of the various software applications on the computer terminal 104.

Regarding the video review application 144, this can be run on the computer terminal 104 and may include a search User Interface (UI) module for cooperation with a search session manager module in order to enable a computer terminal user to carry out actions related to providing input in relation images, live video and video recordings (such as, for example, input to facilitate carrying out one or more appearance searches). Also, regarding the aforementioned search session manager module, this provides a communications interface between the search UI module and a query manager module 164 of the server system 108. In at least some examples, the search session manager module communicates with the query manager module 164 through the use of Remote Procedure Calls (RPCs). The query manager module 164 receives and processes queries originating from the computer terminal 104, which may facilitate retrieval and delivery of specifically defined video and radar data (and respective metadata) in support of, for example, client-side video review, video export, managing event detection, etc. In this regard, the query manager module is communicatively coupled to one or more data stores 190 (described later herein in more detail) and an appearance search module 192 that supports appearance searches. In accordance with some examples, the query manager module 164 captures operational control inputs received (for instance, sourced from a user operating the input devices 114), which are then stored (as operation parameter data) in suitable storage for later processing in connection with camera performance evaluation.

Regarding the system design tool module 145, this is software for helping a user in designing a system of security cameras (for example, selecting appropriate cameras, lenses, storages appliances, etc. to be deployed within one or more geographic areas). The system design tool module 145 may include code to generate a graphical user interface (for example, provided on the display 126) within which may appear visual and/or audio messages providing recommendations in relation to camera devices (or other types of sensor devices). Such a graphical user interface may also be configured to allow a user to selectively view one or more security cameras within a visual map of a geographical area.

In accordance with at least one example, the system design tool module 145 includes code for generating a graphical user interface to identify and/or simulate the two-dimensional or three-dimensional placement of security cameras and their corresponding performance. For instance, the system design tool module 145 may permit graphical simulation in two-dimensions or three-dimensions, and also show how adding an upgraded security camera can impact performance. For instance, the user can operate the input devices 114 in connection with viewing performance (within a graphical user interface) both prior to and after placement of recommended security cameras. It is also contemplated that the user may be provided with an option to reject a suggested recommendation where instead the system may accept the user chosen camera-related change and then can responsively simulate and show the simulated performance corresponding to the user chosen camera-related change.

Still with reference to FIG. 1, the server system 108 includes several software components (besides the query manager module 164 already described) for carrying out other functions of the server system 108. For example, the server system 108 includes a media server module 168. The media server module 168 handles client requests related to storage and retrieval of security video taken by camera devices $\mathbf{103}_1$-$\mathbf{103}_n$ in the security system 100. The server system 108 also includes a video analytics engine 194. The video analytics engine 194 can, in some examples, be any suitable one of known commercially available software that carry out computer vision related functions (complementary to any video analytics performed in the security cameras) as understood by a person of skill in the art. Also, those skilled in the art will appreciate that, in some instances, the video analytics engine may be programmed with a detection classifier that evaluates a received video stream (for example, an image or part of an image of the video stream captured by one of the camera devices $\mathbf{103}_1$-$\mathbf{103}_n$) to determine if an instance of an object of interest that is defined in the detection classifier is detected or not from the evaluated video stream.

The server system 108 also includes a number of other software components 176. These other software components will vary depending on the requirements of the server system 108 within the overall system. As one example, the other software components 176 might include special test and debugging software, or software to facilitate version updating of modules within the server system 108. As another example, the other software components 176 might include a module to provide server-side support for the system design tool module 145 installed on the computer terminal 104. Also, those skilled in the art will appreciate that system design tool software is not limited to being run only within one or more of the computer terminal 104 and the server system 108. System design tool software may also be provided as a part of one or more cloud services 195 described below in more detail.

Regarding the data store 190, this comprises, for example, one or more databases 191 which may facilitate the organized storing of recorded security video, non-video sensor data, etc. in accordance with example embodiments. The one or more databases 191 may also contain metadata related to, for example, the recorded security video that is storable within the one or more data stores 190. Examples of metadata that may be expected to be derived directly or indirectly from video data include location in field of view, object ID, bounding box-related data, tracking position relative to field of view, etc.

Optionally, the security system 100 may include connections to the illustrated one or more cloud services 195. For example, the computer terminal 104 may be connected to the cloud service(s) 195 by the Internet and/or one or more wireless and/or wired wide area networks (examples of which were previously herein detailed). Similarly, the server system 108 may be connected to the cloud service(s) 195 by the Internet and/or one or more wireless and/or wired wide area networks (examples of which were previously herein detailed). As described in more detail later herein, some example embodiments may include the cloud service(s) 195 which may further include neural network(s) which may potentially improve recommendation messages delivered within the security system 100.

The illustrated security system 100 includes a plurality of camera devices $\mathbf{103}_1$-$\mathbf{103}_n$ (hereinafter interchangeably referred to as "cameras $\mathbf{103}_1$-$\mathbf{103}_n$" when referring to all of the illustrated cameras, or "camera 103" when referring to any individual one of the plurality) being operable to capture a plurality of images and produce image data representing the plurality of captured images. The camera 103 is an image capturing device and includes security video cameras. Furthermore, it will be understood that the security system 100 includes any suitable number of cameras (i.e. n is any suitable integer greater than one).

The camera 103 includes an image sensor 109 (corresponding to one of the sensors $\mathbf{109}_1$-$\mathbf{109}_N$ shown in FIG. 1) for capturing a plurality of images. The camera 103 may be a digital video camera and the image sensor 109 may output captured light as a digital data. For example, the image sensor 109 may be a CMOS, NMOS, or CCD. In some embodiments, the camera 103 may be an analog camera connected to an encoder. The illustrated camera 103 may be a 2D camera; however use of a structured light 3D camera, a time-of-flight 3D camera, a 3D Light Detection and Ranging (LiDAR) device, a stereo camera, or any other suitable type of camera within the security system 100 is contemplated.

The image sensor 109 may be operable to capture light in one or more frequency ranges. For example, the image sensor 109 may be operable to capture light in a range that substantially corresponds to the visible light frequency range. In other examples, the image sensor 109 may be operable to capture light outside the visible light range, such as in the infrared (IR) and/or ultraviolet range. In other examples, the camera 103 may be a "multi-sensor" type of camera, such that the camera 103 includes pairs of two or more sensors that are operable to capture light in different and/or same frequency ranges.

The camera 103 may be a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another camera. For example, the dedicated camera may be a security camera, such as any one of a Pan-Tilt-Zoom (PTZ) camera, dome camera, in-ceiling camera, box camera, and bullet camera.

Additionally, or alternatively, the camera 103 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

The camera 103 includes one or more processors 113 (corresponding to one of the processors $\mathbf{113}_1$-$\mathbf{113}_N$ shown in FIG. 1), one or more video analytics modules 119 (corresponding to one of the video analytics modules $\mathbf{119}_1$-$\mathbf{119}_N$ shown in FIG. 1), and one or more memory devices 115 (corresponding to one of the memories $\mathbf{115}_1$-$\mathbf{115}_N$ shown in FIG. 1) coupled to the processors and one or more network interfaces. Regarding the video analytics module 119, this generates metadata outputted to the server system 108. The metadata can include, for example, records which describe various detections of objects such as, for instance, pixel locations for the detected object in respect of a first record and a last record for the camera within which the respective metadata is being generated.

Regarding the memory device 115, this can include a local memory (such as, for example, a RAM and a cache memory) employed during execution of program instructions. Regarding the processor 113, this executes computer program instructions (such as, for example, an operating system and/or software programs), which can be stored in the memory device 115.

In various embodiments the processor 113 may be implemented by any suitable processing circuit having one or more circuit units, including a digital signal processor (DSP), graphics processing unit (GPU) embedded processor, a visual processing unit or a vison processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the camera 103, including the processor 113, may be combined together on one semiconductor chip. For example, the processor 113, the memory device 115 and the network interface of the camera 103 may be implemented within a SOC. Furthermore, when implemented in this way, a general purpose processor and one or more of a GPU or VPU, and a DSP may be implemented together within the SOC.

In various example embodiments, the memory device 115 coupled to the processor 113 is operable to store data and computer program instructions. The memory device 115 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device 115 may be operable to store memory as volatile memory, non-volatile memory, dynamic memory, etc. or any combination thereof.

Continuing with FIG. 1, the camera 103 is coupled to the server system 108. In some examples, the camera 103 is coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the camera 103 and the server system 108 can be any number of known arrangements, examples of which were previously herein detailed. In at least one example embodiment, the camera 103 and the server system 108 are within the same Local Area Network (LAN). In some examples, the camera 103 may be coupled to the server system 108 in a more direct manner than as described above.

Although the security system 100 illustrated in FIG. 1 only explicitly shows video sensor devices coupled to the server system 108, it will be understood that the security system 100 is not limited in contemplated compositions to just video sensor devices. Some examples of the security system 100 include a heterogeneous mixture of both video sensor devices and non-video sensor devices coupled to the server system 108. One type of non-video sensor device is a radar-based sensor device such as, for example, the Avigilon Presence Detector (APD)™ sold by Avigilon Corporation.

Figure 2:
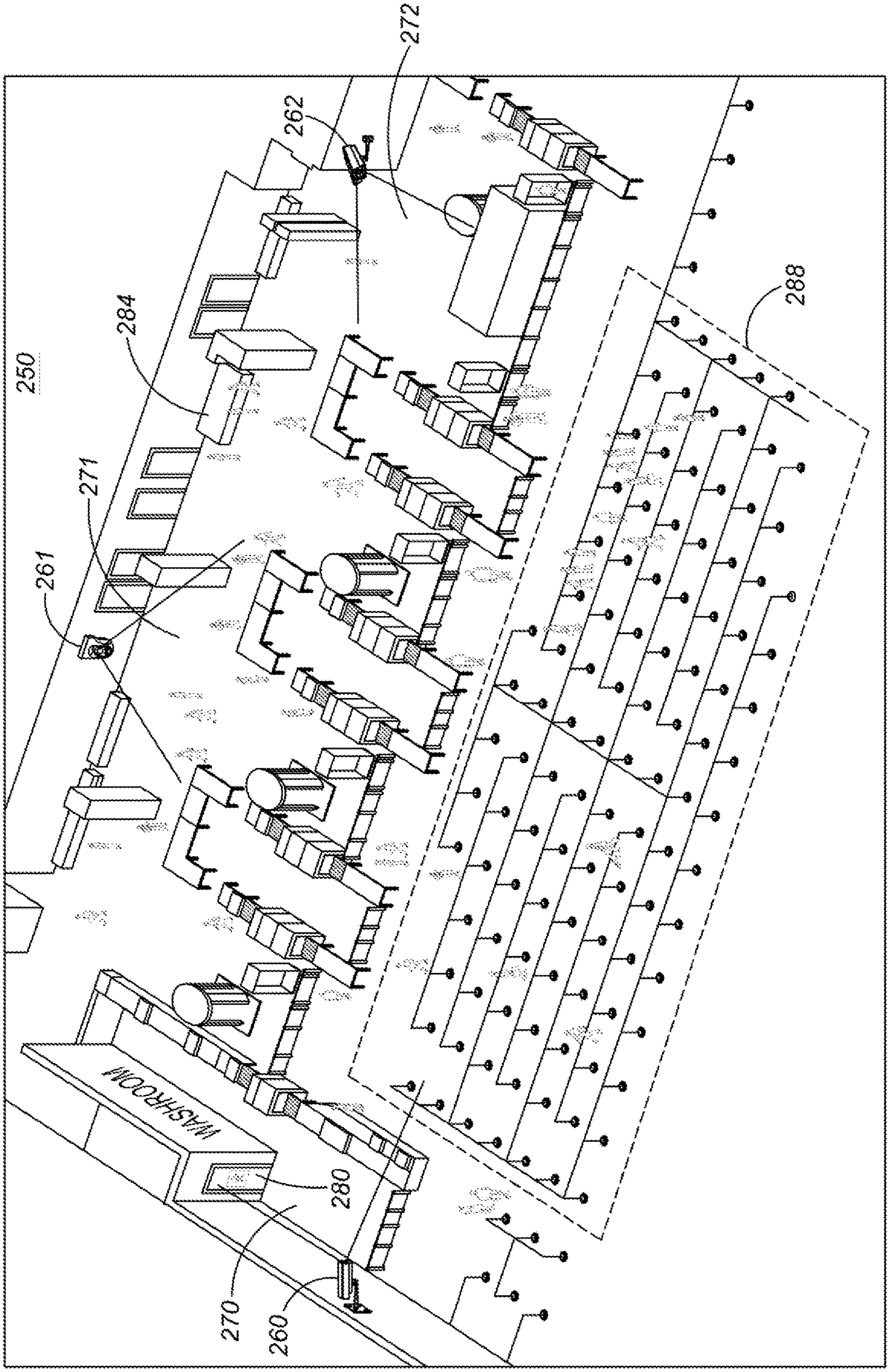
FIG. 2 is a diagram illustrating airport geographic areas, and respective camera devices deployed for those geographic areas in accordance with an example embodiment.

Reference is now made to FIG. 2. FIG. 2 is a diagram illustrating an example of the security system 100 installed within an airport 250. The airport 250 includes a plurality of geographic areas, and respective camera devices 260-262 deployed for those geographic areas in accordance with an example embodiment.

As a preliminary note, each of the camera devices 260-262 may be similar to one of the cameras $\mathbf{103}_1$-$\mathbf{103}_n$ described previously. The camera device 260 has a respective Field Of View (FOV) 270, the camera device 261 has a respective FOV 271, and the camera device 262 has a respective FOV 272. The FOV 270 corresponds to the geographic area where the camera device 260 is deployed. The FOV 271 corresponds to the geographic area where the camera device 261 is deployed. The FOV 272 corresponds to the geographic area where the camera device 262 is deployed.

FIG. 2 is described later herein in more detail in relation to examples of assessing performance of video security cameras and making recommendations in conformance with at least some example embodiments.

Figure 3:
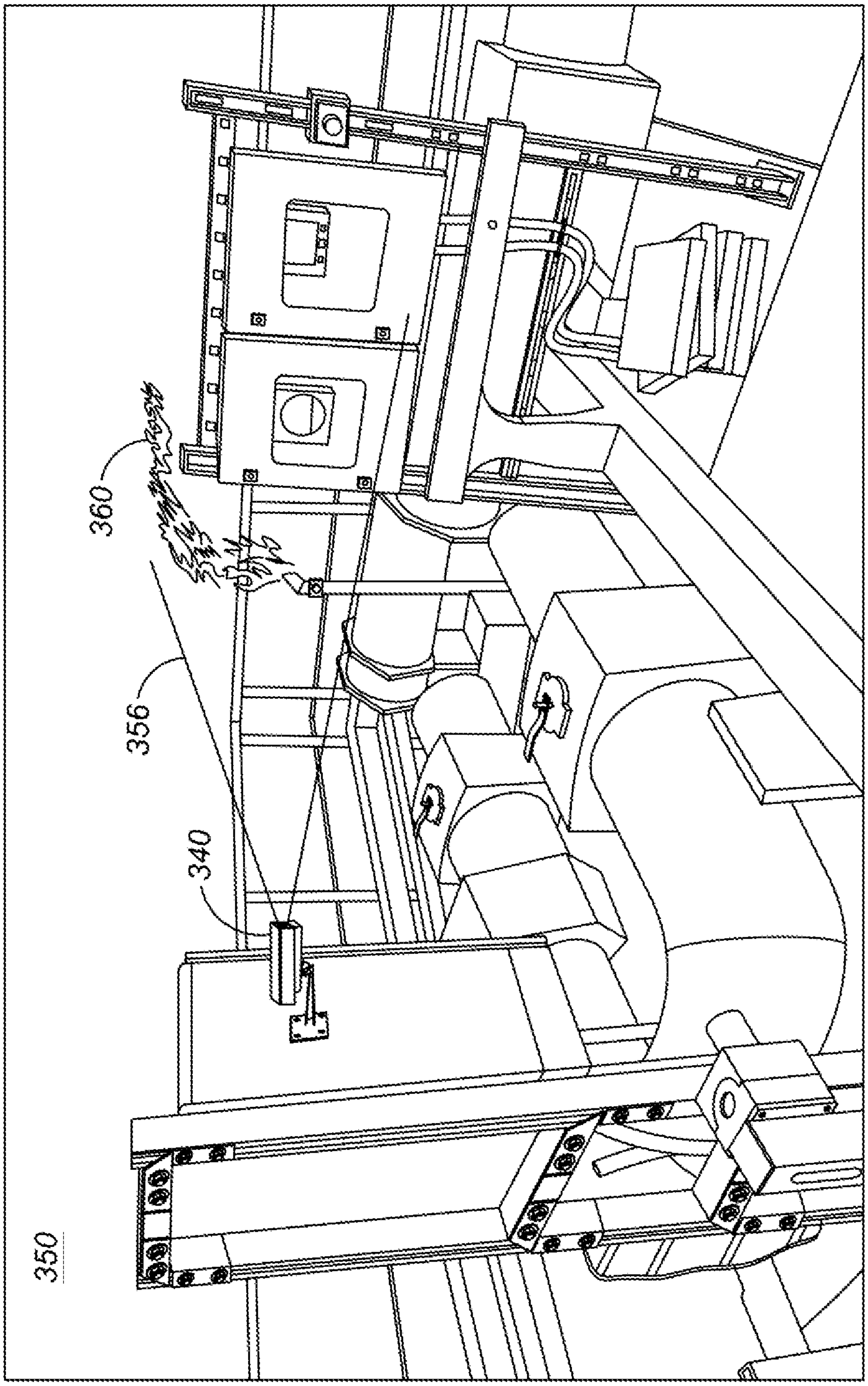
FIG. 3 is a diagram illustrating a geographic area at an industrial site, and a respective camera device deployed for this geographic area in accordance with an alternative example embodiment.

Continuing on, FIG. 3 is a diagram illustrating a camera device 340 installed at an industrial site 350 in accordance with an alternative example embodiment. Similar to what was previously described in relation to FIG. 2, the camera device 340 (which may be similar to one of the cameras $\mathbf{103}_1$-$\mathbf{103}_n$ described previously) is deployed for a respective geographic area. The camera device 340 has a respective FOV 356 and, in the illustrated diagram, captures smoke 360 from a fire burning within the geographic area.

FIG. 3 is described later herein in more detail in relation to an example of assessing performance of a video security camera and making a recommendation in accordance with at least one example embodiment.

Figure 4:
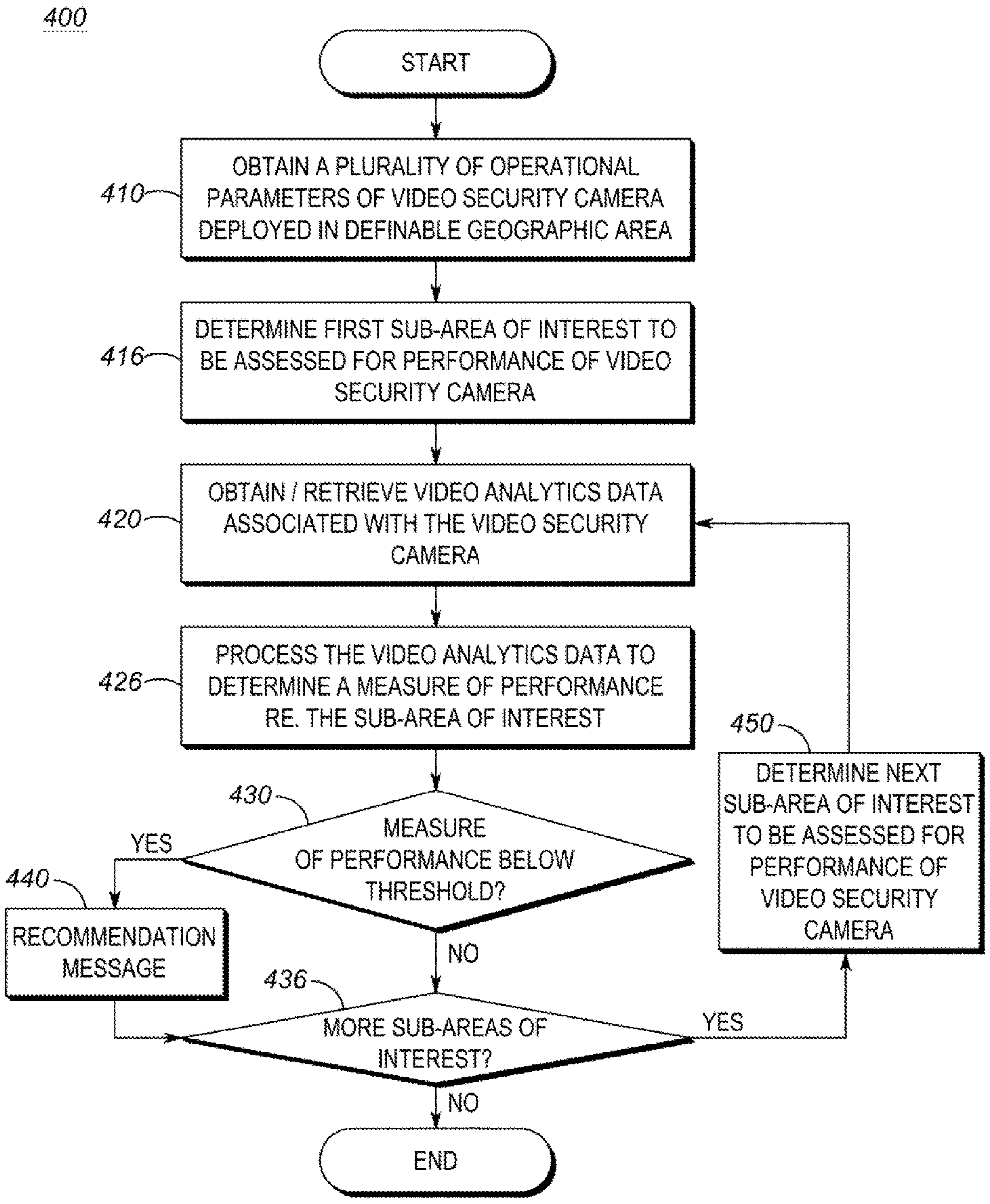
FIG. 4 is a flow chart illustrating a method for recommending changes in relation to video security camera deployment in accordance with an example embodiment.

Reference is now made to FIG. 4. FIG. 4 is a flow chart illustrating a method 400 for recommending changes in relation to video security camera deployment within the security system 100 in accordance with an example embodiment. Firstly, in the method 400, a plurality of operational parameters of one or more of the camera devices $\mathbf{103}_1$-$\mathbf{103}_n$ deployed in a definable geographic area are obtained (410) from storage(s) accessible within the security system 100 such as, for example, one or more of the memory devices 115, the non-volatile storage 120, the data store 190, other storage (for instance, storage in the cloud). Examples of operational parameters include, among other things, i) the functional capabilities; and ii) operational control inputs (for instance, object search inputs, pan, zoom, tilt operation inputs, etc.) received from a user of the computer terminal 104 shown in FIG. 1.

Next in the method 400, a first sub-area of interest to be assessed for performance of the camera device 103 is determined (416). (Examples of performance evaluation-selected sub-areas are later herein mentioned, the management of which will be understood by those skilled in the art and which will vary based on the needs and operation of the security system 100.)

Next in the method 400, video analytics data associated with the camera device 103 is obtained or retrieved (420). In some examples, the video analytics data is generated by the video analytics engine 194 (previously described herein with reference to FIG. 1). It will be understood that any suitable video analytics data is contemplated including, but not limited to, metadata identifying features or characteristics (for instance, video analytics data points) about the particular object or event of interest that is detected (with confidence level or qualifying metrics) from the captured video stream. In some instances, the metadata identifying features or characteristics about the object or event of interest may be reported separately or along (for example, as an annotation in the form of audio or text) with the respective image or image sequences featuring the object or event of interest.

Next in the method 400, the video analytics data is processed (426) to determine a measure of performance in relation to the sub-area of interest. In this regard, any of various suitable measures of performance are contemplated. For example, performance may be measured in relation to quality scores of the face image for each face detection to ensure that there is sufficient detail for face recognition. As another example, performance may be measured in relation to a confidence level in optical character recognition in license plate recognition for each visible plate on detected vehicles. As yet another example, performance may be measured in relation to a ratio of recognized/classified objects versus unknown objects detected. In at least one example, a measure of performance may be obtained by making a comparison of data obtained from the evaluated security camera as against data obtained from another sensor device (for instance, counting via video tripwire versus counting by another sensor that employs simple motion sensing). In connection with such measuring of performance, evaluation could be based on comparison of two single count totals over one continuous period of time, or alternatively it could be based on something else (for instance, averaging count totals over a plurality of periods of time).

Next in the method 400 is decision action 430, namely checking if the measure of performance is below a threshold. If the measure of performance is not below the threshold, then decision action 436 follows; however, if the measure of performance does fall below the threshold, then a recommendation message is generated and delivered (440). For example, the recommendation message may be delivered as visual message on the display screen 126 of the computer terminal 104 (FIG. 1). Alternatively, the recommendation message may be delivered in some other manner such as, for example, by way of an audio message emitted via a speaker. In accordance with some examples, recommendation messages may be stored and/or generated under control of the cloud service(s) 195 (FIG. 1). In this manner, statistics may be collected and used to the benefit of all users subscribed to the cloud service(s) 195. For example, neural networks and/or other artificial intelligence may be employed within the cloud to leverage the learning of recommendations built over time (for example, recommendations in relation to previous similar deployments).

EXAMPLE RECOMMENDATION MESSAGES

EXAMPLE TYPE I—One example amongst types of recommendation messages is recommending a change in a spatial position of the security camera. For instance, a washroom door 280 (FIG. 2) is included within the FOV 270 of the camera device 260. Thus, people going through the washroom door 280 may be captured and detected as an object of interest (for instance, by video analytics module 119 of the security camera). Then (over time) such people exiting the washroom door 280 may exhibit embarrassment (i.e. the camera device 260 that they see when they exit causes the embarrassment). In this regard, a contemporaneous embarrassment event may be established by capturing some suitable number of images of a person temporarily present within a sub-area of interest corresponding to the washroom door 280, and then responsively performing video analytics in relation to gesture, facial reactions/patterns, or other embarrassment-linked behaviors detected from the captured images.

Consequently, there may be assessment as to whether or not the exhibiting of embarrassment occurs enough times over a period of video security performance evaluation such as to cause a performance threshold to be exceeded. In such a case, the recommendation message may recommend that the spatial position of the camera device 260 be changed such that the sub-area corresponding to the washroom door 280 is no longer within the FOV 270 of the camera device 260. (It will be understood that various other examples of performance evaluation-selected sub-areas that falls within a geographic area of a security camera are also contemplated including the occurrence of certain event types in a particular sub-area, increase in assigned importance of monitoring a door falling within a particular sub-area, etc.)

Also, it is possible that changing the spatial position of the camera device 260 may create a new coverage gap around the washroom area, and consequently the recommendation message may also recommend adding a radar-based sensor device, for example, to fill the coverage gap. Other suitable alternative recommendation messages are contemplated such as, for example, recommending replacement of the camera device 260 with a radar-based sensor device rather than just adding such a device while having the security system 100 continue to include the camera device 260.

EXAMPLE TYPE II—Another example amongst types of recommendation messages is recommending an upgrade in an operational parameter of the security camera. For instance, say that the camera device 103 has limited power which limits the camera device's ability at certain times to perform certain near real time video analytics features. In such a case, video security performance may be evaluated over a period of time and it may be determined that, due to power management disablement of certain video analytics, performance relative to one or more sub-areas of interests may be below a performance threshold. In such a case, the recommendation message may recommend that power to the camera device 103 be increased by upgrading the power source (for instance, changing from a Power-Over-Ethernet power source to a dedicated, higher wattage power source).

EXAMPLE TYPE III—Another example amongst types of recommendation messages is recommending deployment of a new security camera (with an upgraded operational parameter and which will replace the old security camera, or alternatively simply addition of another security camera that does not necessarily include an upgraded operational parameter but is added in for some other reason). For instance, say that the camera device 261 is a security camera that is capable of remote directional and zoom control (e.g. a Pan-Tilt-Zoom camera). Next say people may walk across the FOV 271 of the camera device 261 towards information desk 284, but despite efforts of the remote operator, tracking of these objects of interest is lost before they arrive at the information desk 284 (i.e. due to insufficient camera pan range in this case; however in other alternative example cases a PTZ camera may be deficient in some other respect like insufficient zoom, insufficient tilt range, etc.). In such a case, video security performance may be evaluated over a period of time and it may be determined that, due to insufficient camera pan range, performance relative to a sub-area of interest located at an edge of the FOV 271 may be below a performance threshold. In such a case, the recommendation message may recommend that the camera device 261 be replaced by a different camera device to provide wider FOV such as, for instance, a PTZ camera with greater pan range, a multi-head camera device, etc.

Other scenarios are also contemplated. For instance, it is possible that results delivered to the client-side review application 144 (FIG. 1) by the appearance search module 192 may be impacted by the adequacy of security camera adjacency within the security system 100.

Accordingly, performance evaluation may occur collectively in relation to a subset of two or more of the camera devices $\mathbf{103_1}$-$\mathbf{103_n}$ in relation to adequacy of security camera adjacency. When performance is below a threshold the recommendation may be to add a new security camera (that does not necessarily include an upgraded operational parameter) to fill a coverage gap.

Continuing on in the discussion of alternative scenarios (and still with reference to "EXAMPLE TYPE III" but returning to the discussion in relation to FIG. 2) say that the camera device 262 is a box camera device with low optical zoom capabilities and objects of interest (for instance, people) within waiting line-up area 288 are too frequently recognized with low confidence (for instance, below 60%, below 50%, or some other suitable percentage as set within the system). In such a case, video security performance may be evaluated over a period of time and it may be determined that, due to low optical zoom capabilities of the camera device 262, performance relative to one or more sub-areas of interest may be below a performance threshold. In such a case, the recommendation message may recommend that the camera device 262 be replaced by a different camera device with better optical zoom capabilities so that objects of interest within the waiting line-up area 288 may be recognized with greater confidence.

Also, for greater certainty of understanding, it will be understood that while confidence level in relation to object recognition is mentioned explicitly above in relation to "EXAMPLE TYPE III", confidence level in relation to object recognition may apply as well in relation to "EXAMPLE TYPE II" and "EXAMPLE TYPE I", the details of which will be readily understood by those skilled in the art.

FIG. 3 is illustrative of a further "EXAMPLE TYPE III". In particular, video analytics detection (and associated video analytics data) in relation to the smoke 360 may be assessed to determine and trigger a recommendation that the camera device 340 be replaced by a different camera device that is explosion protected in design. (It should be noted that recommending such a change is not necessarily tied to video analytics detection of fire or smoke. For instance, video analytics could detect and identify certain types of structures and structural detail that is within the security camera's FOV and associated with hazardous risk such as, for example, oil rig structure, propane storage tanks and containers, natural gas plant structure, and other similar types of structures and structural detail).

It will be appreciated that other types of somewhat similar replacement recommendations are also contemplated. For example, a recommendation may relate to an IR or thermal radiation capability lacking in the at least one security camera. Also, the recommendation will not necessarily always be camera replacement for these types of security improvements. For example, in the case where the camera device can be retrofitted with an additional IR or thermal module (as the case may be) then camera replacement may not be required to achieve the upgraded operational parameter that is recommended.

With reference once again to the method 400 of FIG. 4, the decision action 436 follows the action 440, namely checking whether there are any more sub-areas of interest to be assessed in relation to performance. If "NO", then it is the end of the illustrated method 400. If "YES", then a next sub-area of interest to be assessed for performance of the camera device 103 is determined (450). Next, additional actions of the method are repeated starting with the action 420. Also, it will be understood that the method 400 is not limited to performance evaluation in relation to merely one of the camera devices $\mathbf{103}_1$-$\mathbf{103}_n$ at a time. Contemporaneous or concurrent performance evaluation of any suitable number (even all) of the camera devices $\mathbf{103}_1$-$\mathbf{103}_n$ is contemplated.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot process video analytics data to assess performance of a security camera relative to a sub-area of interest that falls within a geographic area, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method for recommending changes in relation to video security camera deployment within a security system, the computer-implemented method comprising:

obtaining, at at least one electronic computing device, a plurality of operational parameters of at least one video security camera that is deployed in a definable geographical area;

determining, at the at least one electronic computing device, at least one sub-area of interest that is inside the geographical area, to be assessed for video security performance based on a plurality of received object search inputs that correspond to a plurality of video frames captured by the at least one video security camera;

obtaining, at the at least one electronic computing device, video analytics data associated with the at least one video security camera operating under the operational parameters, the video analytics data identifying respective confidence levels with which a plurality of objects of interest are recognized based on the object search inputs;

determining, at the at least one electronic computing device, a measure of performance of the at least one video security camera relative to the at least one sub-area of interest as a function of the respective confidence levels, wherein:

the measure of performance is lower than a performance threshold over a defined period of time when a ratio of recognized objects versus unknown objects detected during the defined period of time drops below the performance threshold, and objects are categorized as recognized or unknown based on whether their respective confidence levels meet a predefined confidence percentage threshold; and based on the measure of performance of the at least one video security camera being lower than the performance threshold, providing a visual recommendation message or an audio recommendation message, delivered by a screen or a speaker respectively, describing an available user action choice amongst a plurality of available user action choices, and the available user action choice of the visual recommendation message or the audio recommendation message being at least one of:

a recommended change in spatial position of the at least one video security camera;

a recommended upgrade in at least one of the operational parameters of the at least one video security camera; and a recommended deployment of at least one new video security camera, wherein the new video security camera will:

have an upgraded operational parameter; and replace the at least one video security camera.

2. The computer-implemented method as claimed in claim 1 wherein the visual or audio recommendation message indicates at least the recommended change in the spatial position of the at least one video security camera.

3. The computer-implemented method as claimed in claim 1 wherein the visual or audio recommendation message indicates at least the recommended upgrade in the at least one of the operational parameters of the at least one video security camera.

4. The computer-implemented method as claimed in claim 1 wherein the visual or audio recommendation message indicates at least the recommended deployment of the at least one new video security camera, with the upgraded operational parameter and which will replace the at least one video security camera.

5. The computer-implemented method as claimed in claim 4 wherein at least one new video security camera is a Pan-Tilt-Zoom (PTZ) camera, and the upgraded operational parameter is increased camera pan range, increased camera tilt range or increased optical zoom.

6. The computer-implemented method as claimed in claim 4 wherein the upgraded operational parameter relates to an infrared or thermal radiation capability lacking in the at least one video security camera.

7. The computer-implemented method as claimed in claim 4 wherein the upgraded operational parameter relates to a higher mega-pixel imaging capability than possessed by the at least one video security camera.

8. The computer-implemented method as claimed in claim 4 wherein the at least one video security camera is a single-head camera and the at least one new video security camera is a multi-head camera.

9. The computer-implemented method as claimed in claim 1 further comprising:

processing the video analytics data to determine that another sub-area of the at least one sub-area of interest, which is within a Field Of View (FOV) of the at least one video security camera, is being traversed by people contemporaneously exhibiting embarrassment, and wherein the visual or audio recommendation message further indicates a recommendation to change the FOV of the at least one video security camera to exclude the another sub-area.

10. The computer-implemented method as claimed in claim 9 wherein the visual or audio recommendation message further indicates a further recommendation to deploy a new radar-based security device configured to cover the another sub-area.

11. The computer-implemented method as claimed in claim 1 further comprising:

processing the video analytics data to determine that at least one fire-related event occurred in another sub-area of the at least one sub-area of interest, and wherein:

the visual or audio recommendation message indicates at least the recommended deployment of the at least one new video security camera, and the at least one new video security camera is an explosion protected security camera.

12. A security system comprising:

at least one video security camera deployable in a definable geographical area, the at least one video security camera including at least one image sensor configured to capture a plurality of video frames;

at least one electronic computing device communicatively coupled to the at least one video security camera and configured to:

obtain a plurality of operational parameters of the at least one video security camera;

determine at least one sub-area of interest, inside the geographical area, to be assessed for video security performance based on a plurality of received object search inputs that correspond to the plurality of video frames;

obtain video analytics data associated with the at least one video security camera operating under the operational parameters, the video analytics data identifying respective confidence levels with which a plurality of objects of interest are recognized based on the object search inputs; and determining a measure of performance of the at least one video security camera relative to the at least one sub-area of interest as a function of the respective confidence levels, wherein:

the measure of performance is lower than a performance threshold over a defined period of time when a ratio of recognized objects versus unknown objects detected during the defined period of time drops below the performance threshold, and objects are categorized as recognized or unknown based on whether their respective confidence levels meet a predefined confidence percentage threshold; and a screen or a speaker communicatively coupled to the at least one electronic computing device, based on the measure of performance of the at least one video security camera being lower than the performance threshold, the screen or speaker is configured to operate cooperatively with the at least one electronic computing device in providing a visual recommendation message or an audio recommendation message, respectively, describing an available user action choice amongst a plurality of available user action choices, and the available user action choice of the visual recommendation message or the audio recommendation message being at least one of:

a recommended change in spatial position of the at least one video security camera;

a recommended upgrade in at least one of the operational parameters of the at least one video security camera; and a recommended deployment of at least one new video security camera, wherein the new video security camera will:

have an upgraded operational parameter; and replace the at least one video security camera.

13. The security system as claimed in claim 12 wherein the at least one electronic computing device is included in one or both of a server and a client device forming part of the security system, and the client device includes the screen.

14. The security system as claimed in claim 13 wherein the client device includes a system design tool module configured to generate a graphical user interface within which the visual recommendation message is displayed.

15. The security system as claimed in claim 14 wherein the graphical user interface is configured to allow a user to selectively view the at least one video security camera within a visual map of the geographical area.

16. The computer-implemented method as claimed in claim 1 wherein the measure of performance depends in part on an analytics-based count comparison carried out between counts from respective devices which are the at least one video security camera and another sensor device.

17. The security system as claimed in claim 12 wherein the measure of performance depends in part on an analytics-based count comparison carried out between counts from respective devices which are the at least one video security camera and another sensor device.

18. The computer-implemented method as claimed in claim 4 further comprising causing a system design tool to be operated both before and after a recommended deployment of the at least one new video security camera, wherein performance evaluation input from a user is received via a graphical user interface of the system design tool both before and after the recommended deployment.

19. The security system as claimed in claim 14 wherein:

the visual or audio recommendation message indicates at least the recommended deployment of the at least one new video security camera, with the upgraded operational parameter and which will replace the at least one video security camera, and the graphical user interface is configured to receive performance evaluation input from a user both before and after the recommended deployment.

* * * * *